Feb. 27, 1934.  D. F. LUCKING  1,949,166
MEANS FOR INDICATING THE HEIGHT OF AIRCRAFT, PARTICULARLY
FOR USE WHEN THE AIRCRAFT IS LANDING
Filed Aug. 16, 1933  2 Sheets-Sheet 1
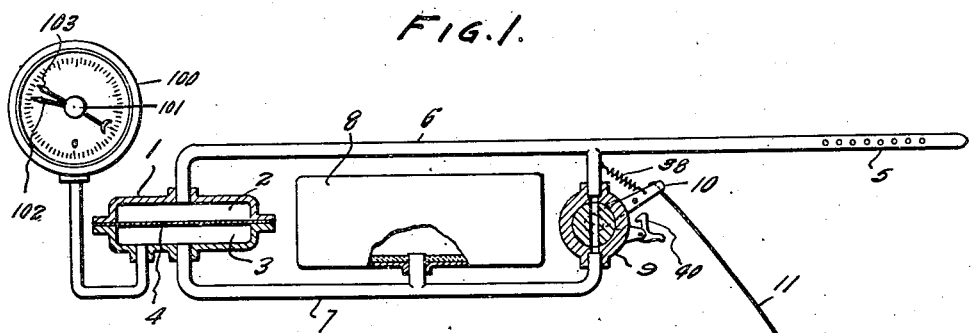
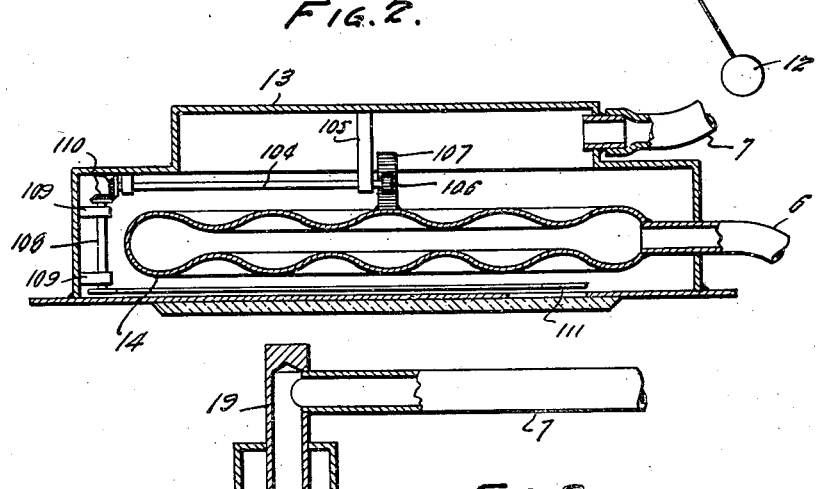
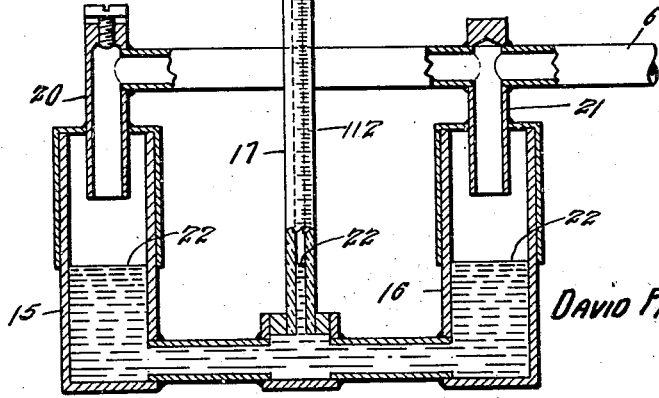
Inventor
DAVID FREDERICK LUCKING
By Semmes & Semmes
Attorneys Feb. 27, 1934.   D. F. LUCKING   1,949,166
MEANS FOR INDICATING THE HEIGHT OF AIRCRAFT, PARTICULARLY
FOR USE WHEN THE AIRCRAFT IS LANDING
Filed Aug. 16, 1933   2 Sheets-Sheet 2
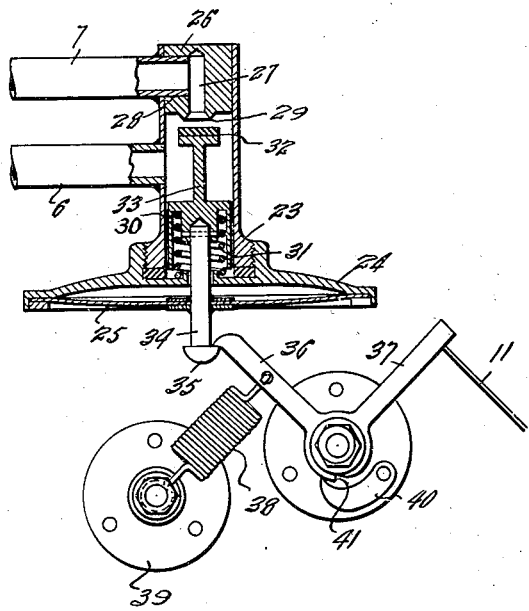
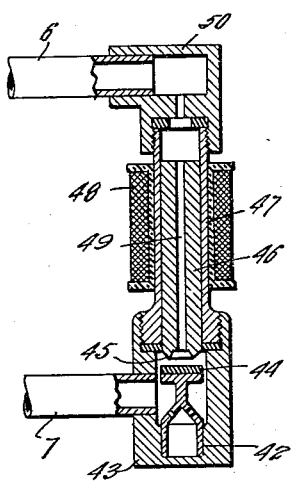
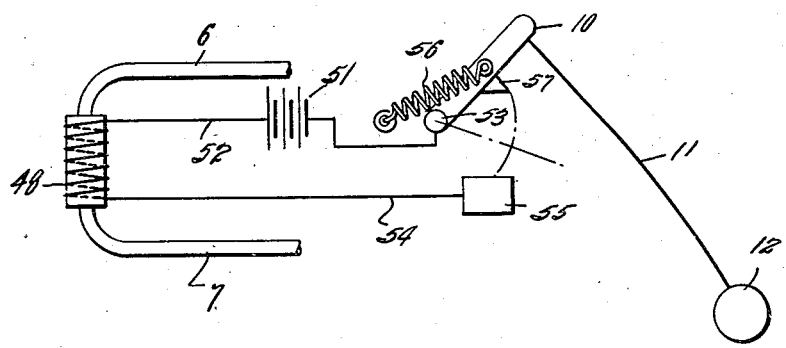
Inventor
DAVID FREDERICK LUCKING
By Semmes & Semmes
Attorneys Patented Feb. 27, 1934

1,949,166

UNITED STATES PATENT OFFICE 1,949,166

MEANS FOR INDICATING THE HEIGHT OF AIRCRAFT, PARTICULARLY FOR USE WHEN THE AIRCRAFT IS LANDING

David Frederick Lucking, Felixstowe, England, assignor to Temple N. Joyce, Dundalk, Md.

Application August 16, 1933, Serial No. 685,471
In Great Britain January 20, 1932

REISSUED

6 Claims. (Cl. 73—4)

This invention relates to means for indicating the height of aircraft, particularly for use when the aircraft is landing.

The altimeters heretofore employed have been the ordinary aneroid type barometer, modified to meet special requirements. None of the altimeters now in use are sensitive enough to record accurately the height of an aircraft when it is desired to land the same upon the surface of the land or water. Another disadvantage of the instruments now used is that the scales have been graduated for thousands of feet and not for feet, such as disclosed in the present invention.

The object of the present invention is to provide such means which shall be adapted continuously to inform the pilot of the aircraft of the height of the latter above the surface of the land or water after the aircraft has descended to a predetermined height above the said surface. The invention will thus be found to be of the greatest use when darkness or other conditions prevent the pilot observing the land or water upon which it is desired to cause the aircraft to alight.

According to the present invention, the means for indicating the height of the aircraft is mounted on the aircraft and comprises height-indicating mechanism, a device for controlling the operation of said mechanism, and means for actuating the control device and including a weight suspended from the aircraft, the arrangement being such that the control device is actuated by the dragging of the weight on the surface of the land or water after the aircraft has descended to and lower than a predetermined height above the land or water.

The height-indicating mechanism is preferably operated by virtue of the difference between the atmospheric pressure in its neighbourhood when said mechanism is first put into operation at the predetermined height and the varying atmospheric pressure or dynamic air pressure which exists in the neighbourhood of said mechanism after the height-indicating mechanism has been put into operation and as the aircraft descends below the predetermined height. The height-indicating mechanism includes operating means which, in accordance with the position of said control device, is subjected only to the atmospheric pressure or to the dynamic air-pressure which exists in the neighbourhood of the mechanism when the aircraft is at or above the said predetermined height or is subjected, on the one hand, to the atmospheric pressure at the said height and, on the other hand, to the varying atmospheric pressures or dynamic air pressures which exist in the neighbourhood of said mechanism as the aircraft descends below the said predetermined height.

In order to operate the height-indicating mechanism use may be made of a diaphragm which is enclosed in a casing and acts to divide the casing into two chambers. One of said chambers constantly communicates with a static or pressure head whilst the other chamber is adapted to communicate with or to be cut off from communication with the static or pressure head in accordance with the position of the control device. In this arrangement, a pipe connects one of the said compartments to the control device and it is preferable also to connect the said pipe to a heat-insulated air container.

The said control device may consist of a valve, which is adapted to be brought to the position in which the height-indicating mechanism can operate, under the action of valve-control means actuated by a pull caused by the dragging of said weight over the surface of the land or water, said pull being transmitted to said valve-control means through a wire, cable or the like.

As will appear hereafter, various modifications of the control valve and of the operating means for the height-indicating mechanism are possible.

In the construction in which a diaphragm is used in the control of the height-indicating mechanism and in which a static head is also used, the height-indicating instrument operates on the difference between the atmospheric pressure in its neighbourhood and on one side of the diaphragm and that inside the other chamber and on the other side of the diaphragm. Whilst the control valve is open, the pressures in both chambers are atmospheric, whilst when the valve is closed the pressure within one of the chambers remains the same, or substantially the same, as it was when the valve was first closed, the pressure in the other chamber increasing as the aircraft loses height. The difference in pressure is made to influence the diaphragm, and the corresponding loss of height is indicated by a scale, dial, needle or other means.

In the first instance, the indicator is set so that it will show the approximate height of the aircraft when the weight first touches the surface of the land or water, the said height being approximately known from the physical characteristics of the weight and of its suspension means and from the airspeed of the aircraft. As the aircraft falls lower than the predetermined height, so the indicator shows the lower height, because of the substantially constant pressure in one of the chambers and the increasing atmospheric pressure in the other chamber. Therefore, by a correlation of the controls of the aircraft with the height shown by the indicator, the pilot of the aircraft can make a normal landing without being able to see the surface on which the aircraft is about to alight.

On the accompanying drawings are shown, by way of example, a representation of the complete apparatus and various constructional forms of the altimeter and of the control valve.

On the drawings:—

Fig. 1 is a diagrammatic representation partly in section of the apparatus;

Fig. 2 is a sectional view of an altimeter comprising a capsule;

Fig. 3 is a sectional view of a modified form of altimeter of the liquid manometer type;

Fig. 4 shows, partly in section, a mechanically operated control valve;

Fig. 5 is a sectional elevation of an electrically-operated control valve; and

Fig. 6 is a partly diagrammatic view illustrating the method of controlling the valve shown in Fig. 5.

Referring first to Fig. 1 the apparatus shown in this figure comprises an altimeter 1, consisting of a casing which is divided into two compartments 2 and 3 by means of a flexible diaphragm 4. The compartment 2 of the altimeter is connected to a static head 5 by means of a pipe 6, whilst the compartment 3 is connected to the pipe 6 by means of a pipe 7. The pipe 7 is in constant communication with a heat-insulated air container 8 and is adapted to be put into or out of communication with the pipe 6 by means of a turnable valve 9 provided with an arm 10, to the outer end of which is attached a substantially non-extensible suspension 11 connected, at its opposite end, to a weight 12. Extending from the lower compartment 3 of the casing 1 is a pipe provided at its outer extremity with a pressure gauge 100. Inasmuch as this instrument is employed when the aircraft is landing, the graduated scale reads from 0 feet to 500 feet. It is to be understood that I do not necessarily limit myself to these specific figures as they are used for illustrative purposes. The finger or needle 102 may be adjusted by means of a thumbscrew 101. This enables the pilot to set a predetermined height at which he wishes the indicating mechanism to begin to operate. There is also shown a needle 103 which indicates the height of the aircraft after it has fallen lower than the predetermined height.

In the position of the apparatus shown in Fig. 1 the valve 9 is in its open position, in which position it is held by means of a balance weight or spring 38 the effect of which is sufficient to prevent the valve closing under the gravitational action of the weight 12, the latter, in view of the height of the aircraft above the land or water, being clear of the surface of the land or water. As can be seen from the figure, the pressure throughout the system is atmospheric and, therefore, the diaphragm 4 of the altimeter is in its neutral position. The altimeter comprises a height indicating mechanism, which indicates a predetermined constant height corresponding to the height at which the aircraft will be flying when the weight 12 first touches the surface of the land or water during the descent of the aircraft prior to landing. When the aircraft has descended to the height indicated by the needle 102 of the altimeter indicating mechanism, the weight 12 touches the surface of the land or water and, by dragging on the said surface, pulls on the arm 10 through the suspension 11, the pull being sufficient to overcome the force applied in the opposite direction by the above mentioned balance weight or spring acting on the valve. The said arm, therefore, moves to a position in which the valve is closed and in which, consequently, communication between the pipe 6 and the pipe 7 is cut off. The valve may be retained in its closed position by means of a trip or locking device 40.

After the valve has closed, the air pressure in the compartment 3 of the altimeter, in the pipe 7 and in the air container 8 remains substantially the same as it was when the valve first closed. In other words, the pressure in the said compartment, air container and pipe is that of the atmosphere at the height at which the weight 12 first came into contact with the surface of the land or water. As the aircraft continues to descend below the said height, the pressure in the compartment 2 of the altimeter and in the pipe 6 increases in accordance with the increase in the atmospheric pressure, so that the diaphragm 4 of the altimeter is moved downwards from its neutral position. The indicating mechanism of the altimeter is so arranged that when the diaphragm is deflected downwards from its neutral position, the needle will indicate the decrease in height corresponding to the increase of the atmospheric pressure.

If so desired, the static head 5 may be replaced by a pressure head. In such a case, when the valve 9 is open the air pressures in the compartments 2 and 3 of the altimeter are equal and greater than atmospheric. After the valve 9 has been closed, however, the height indicated by the altimeter may be subject to an error depending mainly upon any change in the velocity of the aircraft subsequent to the closing of the valve, but the pilot of the aircraft can still interpret the indication of the altimeter to guide him to the proper manipulation of the aircraft controls for making a safe landing.

In Fig. 2 is illustrated a modified form of altimeter which comprises an outer casing 13 enclosing an expansible capsule 14, which is arranged in constant communication with the pipe 6. The pipe 7 communicates with the interior of the casing 13. A shaft 104 is journaled in a member 105 fixed to the inner face of the casing 13, said shaft carrying a pinion, 106, adapted to mesh with a rack 107 secured to a capsule 14. A second shaft 108 arranged at right angles to the shaft 104 is journaled with bevel gears 110 adapted to impart any movement of the capsule 14 to the indicating needle 111 fixed to the end of the shaft 108. The operation of this form of altimeter is similar to that of the diaphragm altimeter described above and it is, therefore, unnecessary to describe it more specifically.

A modified form of altimeter is also shown in Fig. 3. This altimeter comprises two vessels 15 and 16, each of which is connected, at its lower part, to a glass tube 17, which, in turn, communicates at its upper end with a vessel 18. The outer face of the tube 17 may be provided with a graduated scale such as shown at 112. The latter is in constant communication through a branch 19 with the pipe 7. The vessels 15 and 16 communicate with the pipe 6 by means, respectively, of branches 20 and 21.

When this form of altimeter is used, a decrease in the height of the aircraft below that at which the weight 12 contacts with the surface of the land or water and, therefore, after the valve 9 has been closed, is shown by an increase in the height of the level of liquid 22 contained in the vessels 15 and 16 and in the tube 17. By reversing the connection of the pipes 6 and 7, however, a decrease in the height of the aircraft after the valve 9 has been closed will be indicated by a decrease in the height of the level of the liquid in the tube 17.

Instead of using the turnable control valve shown in Fig. 1, the valve may take the form illustrated in Fig. 4. In this construction, the valve comprises a body 23 which is screwed at its lower end into a flange 24, a diaphragm 25 being fixed at its peripheral edge to the said flange. The open upper end of the valve body 23 is closed by a plug 26 formed with an axial bore 27 and with a bore 28 at right angles thereto with which the pipe 7 communicates. The said plug is also formed with a valve seat 29 and the pipe 6 communicates with the interior of the valve body below the valve seat. A plunger 30 is slidably arranged in the interior of the valve body and is acted upon by means of a coil spring 31, which tends constantly to thrust the plunger upwards and, thereby, to cause a valve 32, carried by a rod 33 extending from the plunger, to contact with the said valve seat. The said plunger is provided with a downwardly extending plunger 34 which passes through the diaphragm 25 and has a mushroom head 35 at its lower end.

When the aircraft is above or at a height at which the weight 12 is just about to contact with the surface of the land or water, the valve 32 is held out of contact with its valve seat by the co-operation of the head 35 with an arm 36 of a pivoted bell crank lever, whose other arm 37 is connected to the suspension member 11 to which the weight 12 is attached. The valve is retained in its lowermost position as shown in Figure 4 by the pull of a coil spring 38 anchored at one end to the arm 36 and at its other end to a fixed bracket 39.

When the weight 12 touches the surface of the land or water, its drag causes a pull to be exerted upon the arm 37 of the bell crank lever through the suspension member 11, the said pull being sufficient to overcome the pull of the spring 38 on the bell crank lever in the opposite direction. Thus, the bell crank lever turns on its pivot and the outer end of the arm 36 moves out of contact with the mushroom head 35 of the plunger 34. The valve spring 31 then forces the plunger 30 upwards until the valve 32 is in contact with its valve seat 29, whereupon communication between the pipes 6 and 7 is cut off.

In order to retain the bell crank lever in the position in which its arm 36 is out of contact with the head 35, a pawl 40 may be arranged to engage in a recess 41 formed in the hub of the bell crank lever, the said pawl being acted upon by means of a spring which is not shown in the figure.

If so desired, the control valve may be of the electro-magnetically operated form shown in Fig. 5. This valve comprises an armature 42 adapted to slide in a casing 43 with which one end of the pipe 7 is in communication. The said armature is formed with a valve 44 arranged to co-operate with a valve seat 45 formed at the lower end of a core 46 housed in a tube 47 around which is provided a coil 48. The core is provided with an axial duct 49 the upper end of which communicates with the interior of a T-branch 50 to which one end of the pipe 6 is connected. Thus, in the position of the valve shown in Fig. 5, the pipe 6 is in communication with the pipe 7 through the axial duct 49.

During the time when the height of the aircraft exceeds that at which the weight 12 will touch the surface of the land or water, an electric circuit in which the coil 48 is included is open. The core 46, therefore, is not energized and the armature 42, not being attracted, is in its lowermost position as shown in Fig. 5. When, however, the weight touches the surface of the land or water, its drag causes the said electric circuit to be closed. The core 46 is energized and the armature 42 is attracted upwards until the valve 44 is in contact with its valve seat 45, whereupon communication between the pipes 6 and 7 is cut off.

A convenient form of electric circuit and means for operating the same is shown in Fig. 6. This arrangement comprises a battery 51 connected by a conductor 52 to one end of the coil 48, the other terminal of the battery being connected to the pivot 53 of the valve-operating arm 10. The opposite end of the coil 48 is connected by a conductor 54 to a switch anvil 55. The device is so arranged that when the weight 12 is above the surface of the land or water, the arm 10 is retained in the position shown in Fig. 6 by means of a snap-over spring 56. In this position, a contact 57 provided on the arm 10 is out of contact with the switch anvil 55 and, therefore, the circuit through the coil 48 is not completed. When, however, the weight 12 touches the surface of the land or water, its drag causes a pull to be exerted on the arm 10 sufficient to overcome the pull of the spring 56 in the opposite direction. Therefore, the arm 10 is pivoted downwards until the contact 57 engages with the switch-anvil 55, whereupon the circuit through the coil 48 is completed. After the circuit has been closed it is kept closed by the action of the coil spring 56, the said action being readily understandable from an inspection of Fig. 6.

I claim:

1. Means for indicating the height of an aircraft, comprising a height-indicating mechanism, a device for controlling the operation of said mechanism, and means for actuating the control device and including a weight adapted to be suspended from the aircraft, the arrangement being such that the control device is actuated by the dragging of the weight on the surface of the land or water after the aircraft has descended to and lower than a predetermined height above the land or water.

2. Means as claimed in claim 1, wherein said height-indicating mechanism is operated by virtue of the difference between the atmospheric pressure in its neighbourhood when said mechanism is first put into operation at the predetermined height and the varying atmospheric pressure or dynamic air pressure which exists in the neighbourhood of said mechanism after the height-indicating mechanism has been put into operation and as the aircraft descends below the predetermined height.

3. In a device of the character described, an altitude indicating mechanism, a device for controlling the operation of said mechanism, said device including a valve, means for actuating said valve including a weight adapted to be suspended from an aircraft, said valve being actuated by a pull caused by the dragging of the weight over the surface of the land or water.

4. In a device of the character described, an altitude indicating mechanism, a device for controlling the operation of said mechanism, said device including a valve of the turnable plug type, means for actuating said valve including a weight adapted to be suspended from an aircraft, said valve being actuated by a pull caused by the dragging of the weight over the surface of the land or water.

5. In a device of the character described, an altitude indicating mechanism, a device for controlling the operation of said mechanism, said device including an electromagnetically operated valve, means for actuating said valve including a weight adapted to be suspended from an aircraft, said valve being actuated by a pull caused by the dragging of the weight over the surface of the land or water.

6. In a device of the character described a height indicating mechanism, a device for controlling the operation of said mechanism, said device including a spring pressed sliding valve, means for actuating said valve including a weight adapted to be suspended from an aircraft, said valve being actuated by a pull caused by the dragging of the weight over the surface of the land or water.

DAVID FREDERICK LUCKING.